US010380175B2

(12) United States Patent
Abreu de Paula et al.

(10) Patent No.: US 10,380,175 B2
(45) Date of Patent: Aug. 13, 2019

(54) SKETCH-BASED IMAGE RETRIEVAL USING FEEDBACK AND HIERARCHIES

(71) Applicant: International Business Machines Corporation, Armonk, NY (US)

(72) Inventors: Rogerio Abreu de Paula, Sao Paulo (BR); Emilio Ashton Vital Brazil, Rio de Janiero (BR); Rodrigo da Silva Ferreira, Rio de Janiero (BR); Alecio P. Delazari Binotto, Sao Paulo (BR); Renato Fontoura de Gusmao Cerqueira, Rio de Janeiro (BR); Ana Fucs, Rio de Janeiro (BR); Matheus Palhares Viana, Sao Paulo (BR); Vagner Figueredo de Santana, Sao Paulo (BR); Viviane Torres da Silva, Rio de Janeiro (BR)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 15/614,682

(22) Filed: Jun. 6, 2017

(65) Prior Publication Data

US 2018/0349415 A1     Dec. 6, 2018

(51) Int. Cl.
*G06F 16/583*     (2019.01)
*G06K 9/00*     (2006.01)
(Continued)

(52) U.S. Cl.
CPC ........ *G06F 16/5838* (2019.01); *G06F 16/248* (2019.01); *G06F 16/24578* (2019.01);
(Continued)

(58) Field of Classification Search
CPC ........... G06F 17/30256; G06F 17/3053; G06F 17/30554; G06F 3/04883; G06F 16/5838;
(Continued)

(56) References Cited

U.S. PATENT DOCUMENTS 3,624,619 A      11/1971   Ambrosio
5,911,139 A  *   6/1999    Jain .................. G06F 17/30256
(Continued)

FOREIGN PATENT DOCUMENTS

CN       101004748 A      7/2007
EP       0953944 A3       9/2003
(Continued)

OTHER PUBLICATIONS

Unknown; "Expressive drawing and painting with Sketch"; Adobe Photoshop Sketch; Printed Jun. 5, 2017; pp. 6; <http://www.adobe.com/products/sketch.html>.
(Continued)

*Primary Examiner* — Tadesse Hailu
(74) *Attorney, Agent, or Firm* — David Quinn; Hoffman Warnick LLC

(57) ABSTRACT

A system, method and program product for implementing a sketch-based retrieval system. A system is disclosed that includes: an interface having a canvas for entering inputs including user generated strokes, and extracting features associated with the inputs; a hierarchy system for assigning an importance to the inputs; a matching system for retrieving matches from a database based on extracted features and importance associated with the extracted features; a feedback system that provides real-time feedback on the canvas to suggest improved inputs for the user; and a ranking system that ranks retrieved matches for output in the interface by incorporating user interaction history.

20 Claims, 4 Drawing Sheets

(51) Int. Cl.
*G06F 16/248* (2019.01)
*G06F 16/2457* (2019.01)
*G06K 9/48* (2006.01)
*G06K 9/78* (2006.01)
*G06F 16/532* (2019.01)

(52) U.S. Cl.
CPC ....... *G06F 16/532* (2019.01); *G06K 9/00416* (2013.01); *G06K 9/00436* (2013.01); *G06K 9/48* (2013.01); *G06K 9/78* (2013.01)

(58) Field of Classification Search
CPC ............. G06F 16/24578; G06F 16/532; G06F 16/248; G06K 9/00436; G06K 9/00416; G06K 9/48; G06K 9/78
See application file for complete search history.

(56) References Cited

U.S. PATENT DOCUMENTS

| | | | |
|---|---|---|---|
| 7,113,944 B2 | 9/2006 | Zhang et al. | |
| 8,447,752 B2 | 5/2013 | Wang et al. | |
| 9,183,467 B2 | 11/2015 | Wang et al. | |
| 9,324,102 B2 | 4/2016 | Bhardwaj et al. | |
| 2004/0249809 A1* | 12/2004 | Ramani | G06F 17/30259 |
| 2005/0132269 A1 | 6/2005 | Chakraborty | |
| 2005/0283752 A1* | 12/2005 | Fruchter | G06F 17/3079 |
| | | | 717/100 |
| 2006/0227140 A1 | 10/2006 | Ramini et al. | |
| 2007/0061735 A1* | 3/2007 | Hoffberg | G06K 9/00369 |
| | | | 715/744 |
| 2010/0049629 A1* | 2/2010 | Rathod | G06F 17/30277 |
| | | | 705/26.1 |
| 2012/0054177 A1* | 3/2012 | Wang | G06F 17/30277 |
| | | | 707/723 |
| 2012/0162244 A1 | 6/2012 | Ma et al. | |
| 2013/0097181 A1* | 4/2013 | Sud | G06F 17/30864 |
| | | | 707/748 |
| 2014/0108016 A1* | 4/2014 | Albrecht | G01C 21/367 |
| | | | 704/270 |
| 2014/0279265 A1* | 9/2014 | Bhardwaj | G06Q 30/0627 |
| | | | 705/26.63 |
| 2016/0132498 A1* | 5/2016 | Wang | G06F 17/30277 |
| | | | 382/165 |
| 2017/0262479 A1* | 9/2017 | Chester | G06F 17/30277 |

FOREIGN PATENT DOCUMENTS

| | | |
|---|---|---|
| WO | 2012027275 A1 | 3/2012 |
| WO | 2014198051 A1 | 12/2014 |

OTHER PUBLICATIONS

Unknown; "MindFinder: Finding Images by Sketching"; Microsoft; Aug. 12, 2009; Printed Jun. 5, 2017; pp. 4; Copyright Microsoft 2017; <https://www.microsoft.com/en-us/research/project/mindfinder-finding-images-by-sketching/>.

Stacey, Martin et al.; "Sketch Interpretation in Design Communication"; International Conference on Engineering Design; ICED 99 Munich; Aug. 24-26, 1999; pp. 6; <http://www.cse.dmu.ac.uk/-mstacey/pubs/sketch-iced/sketch-iced>.

Wang, Shu et al.; "Sketch-based image retrieval using hierarchical partial matching"; Journal of Electronic Imaging 24; Aug. 2015; Printed Jun. 5, 2017; pp. 4; Copyright 2008-2017 researchgate.net; <https://www.researchgate.net/publication/281478391_Sketch-based_image_retrieval_using_hierarchical_partial_matching>.

* cited by examiner

SKETCH-BASED IMAGE RETRIEVAL USING FEEDBACK AND HIERARCHIES

TECHNICAL FIELD

The subject matter of this invention relates to sketch-based image retrieval, and more particularly to a system and method for image searching based on customizable sketches and real-time feedback.

BACKGROUND

Electronic data retrieval is common task in almost all fields of endeavor. For certain types of data retrieval, such as image searching, existing solutions often lack the necessary efficacy to be truly effective.

For example, there may be instances when a user wants to search for an image, but does not know how to name the desired image and consequently does not know how to articulate a textual search query. In this situation, sketch-based retrieval provides a promising technique to search for image data. Sketch-based image retrieval allows a user to sketch some input, and based on the input, a set of matching images are returned. However, because this area is relatively new field, existing tools lack the ability to effectively interpret complex user inputs and return accurate results.

SUMMARY

Aspects of the disclosure provides a sketch-based image retrieval system and method that utilizes real-time feedback to enhance searching and provides an intuitive way to communicate hierarchy (i.e., importance) of inputted information.

A first aspect discloses a sketch-based retrieval system, including: an interface having a canvas for entering inputs including user generated strokes, and for extracting features associated with the inputs; a hierarchy system for assigning an importance to the inputs; a matching system for retrieving matches from a database based on extracted features and importance associated with the extracted features; a feedback system that provides real-time feedback on the canvas to suggest improved inputs for the user; and a ranking system that ranks retrieved matches for output in the interface.

A second aspect discloses a computer program product stored on a computer readable storage medium, which when executed by a computing system, provides sketch-based retrieval, the program product including: program code for rendering a canvas for entering inputs including user generated strokes, and for extracting features associated with the inputs; program code for assigning an importance to the inputs; program code for retrieving matches from a database based on extracted features and importance associated with the extracted features; program code that provides real-time feedback on the canvas to suggest improved inputs for the user; and program code that ranks retrieved matches for output.

A third aspect discloses a computerized method of providing sketch-based retrieval, including: rendering a canvas for receiving inputs including user generated strokes, and for extracting features associated with the inputs; assigning an importance to the inputs; retrieving matches from a database based on extracted features and importance associated with the extracted features; providing real-time feedback on the canvas to suggest improved inputs for the user; and ranking retrieved matches for output in the interface.

BRIEF DESCRIPTION OF THE DRAWINGS

These and other features of this invention will be more readily understood from the following detailed description of the various aspects of the invention taken in conjunction with the accompanying drawings in which.

Figure 1:
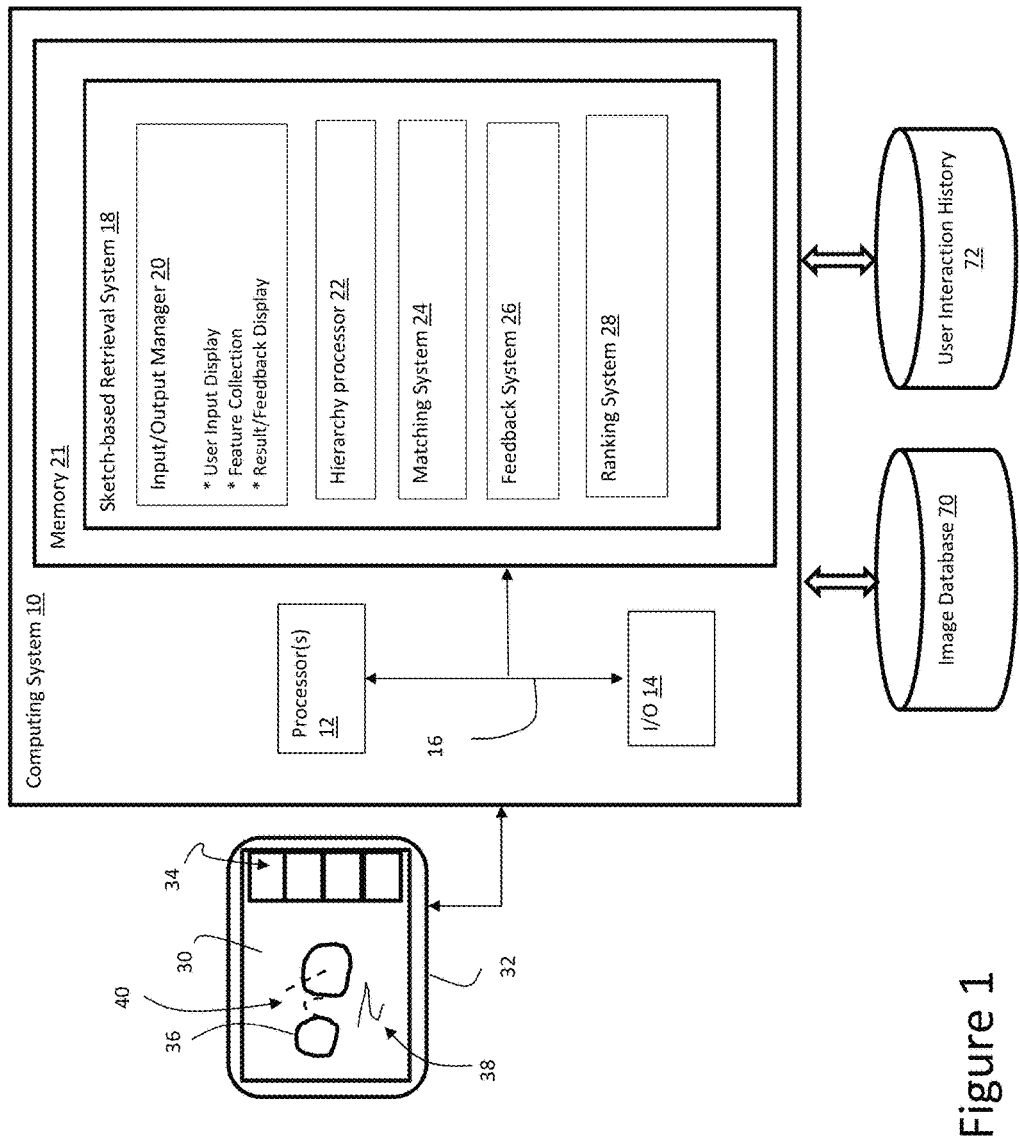
FIG. 1 shows a computing system having a sketch-based retrieval system according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Disclosed is a sketch-based image retrieval system and method in which the user inputs sketches and other information to generate matches in a database. Sketches are generally inputted via strokes made by a user on touch screen or gesture based input system. The described approach provides real-time feedback of the input to enhance the search process. In one embodiment, feedback may include suggestions of a next stroke or identification of problematic strokes (i.e., strokes that result in no matches). Such real-time feedback will result in accelerating the search process and create more accurate results. The approach further provides an intuitive way to communicate an importance hierarchy of inputted data. For example, strokes drawn with greater pressure or slower speed may be interpreted as more important than other strokes. This ability to convey and interpret importance of inputted information, such as a relative importance of different strokes, allows for enhanced searching and ranking of results.

Referring now to the drawings, FIG. 1 depicts a computing system 10 having a sketch-based retrieval system 18 that retrieves image-related data from a database 70 in response to input (i.e., sketches and other data) inputted via an interface device 32 by a user. Interface device 32 may be implemented with a touch screen tablet, laptop, smart device, or other gesture based appliance. Interface device 32 may be fully or partially integrated with the computing system 10 or reside as a standalone device such that some or all of the functions described are performed by either or both the interface device 32 and computing system 10. Database 70 refers to any collection of image-related data, which may for example reside in a single location or be distributed among various storage systems including cloud based storage systems.

Sketch-based retrieval system 18 generally includes an input/output manager 20 that is responsible for displaying and collecting information from the interface device 32. This includes displaying inputs entered by the user, extracting features from the inputs and displaying results and feedback.

Extracted features may for example comprise polylines or curves that may be represented as image data and/or via mathematical formulae.

Interface device 32 generally includes a canvas 30 onto which a user can sketch images by inputting a series of strokes, e.g., with a finger, a pen, a gesture, etc. As the user makes changes to the canvas 30, a set of ranked images 34 (or other data) are retrieved and displayed that most closely match the input. The canvas 30 may include one or more layers for receiving input. Different layers can include, e.g., inputted strokes, loaded images, selectable designs, search categories, etc. Loaded images may for example include photos, patterns, blueprints, seismic images, charts, plots, etc.

In the example canvas 30 shown, a single layer is depicted in which the user has entered two circular shapes 36 and a squiggly line 38. Note that the circular shapes 36 are inputted bolder than the squiggly line 38, indicating a higher importance. Furthermore, in response to the user input, feedback in the form of dashed lines 40 are automatically rendered on the canvas 30 in real-time. The feedback is utilized to help the user better refine the input to achieve enhanced results. For example, the system 18 may not be certain if the user is attempting to draw a bicycle or a pair of glasses. By presenting feedback, the user can click on one of the dashed lines to better define the input. Alternatively, the user could ignore the feedback and continue entering strokes until matching images are identified.

Hierarchy system 22 provides a mechanism through which the user can assign a relative importance to different inputs. For example, relative importance can be assigned by the user with strokes made with greater pressure, with bolder lines, with highlighting, with coloring, via an interface that allows for manual selections, etc. Further, different layers of the canvas 30 may be indicated as more or less important. The relative importance of different inputs will be utilized by the matching system 24 and ranking system 28 when attempting to match and rank retrieved image-related data from the database 70.

Whenever new inputs are detected on the canvas 30, input/output manager 20 will extract "features" associated with the inputs and matching system 24 will attempt to match the features (e.g., curves, polylines, etc.) with indexed image related data in the database 70. Matching can be done on a feature level (e.g., matching circles to wheels) and/or on an entire composite image basis (e.g., matching circles and lines to a complete bicycle).

Feedback system 26 provides real-time feedback to the user as the user enters inputs. For example, when the matching system 24 is having difficulty matching extracted features with image related data in the database 70, feedback system 26 can highlight existing user inputs as problematic inputs that are creating ambiguities, which should either be removed or redrawn. Alternatively, feedback system 26 can generate proposed inputs (e.g., dashed lines 40, blinking lines, colored shapes, etc.) to help guide the user in the input process. Accordingly, based on the displayed proposed inputs, the user can select a proposed input to see if the output results in a desired match.

Regardless, whenever an input results in a set of possible matches, ranking system 28 ranks the retrieved matches and displays them to the user, e.g., as a set of ranked images 34, e.g., as thumbnails, textual descriptions, scrollable images, etc.

Throughout the process, user interaction history 72 can be collected from one or more users. The history 72 can thereafter be analyzed and used to improve future searches and rankings. For instance, the analysis may dictate that inputting two circles indicates the user is attempting to sketch a bicycle 55% of the time, eyeglasses 40% of the time, or something else 5% of the time. Artificial intelligence including the use of neural networks may be utilized to facilitate the analysis and learning process.

Figure 2:
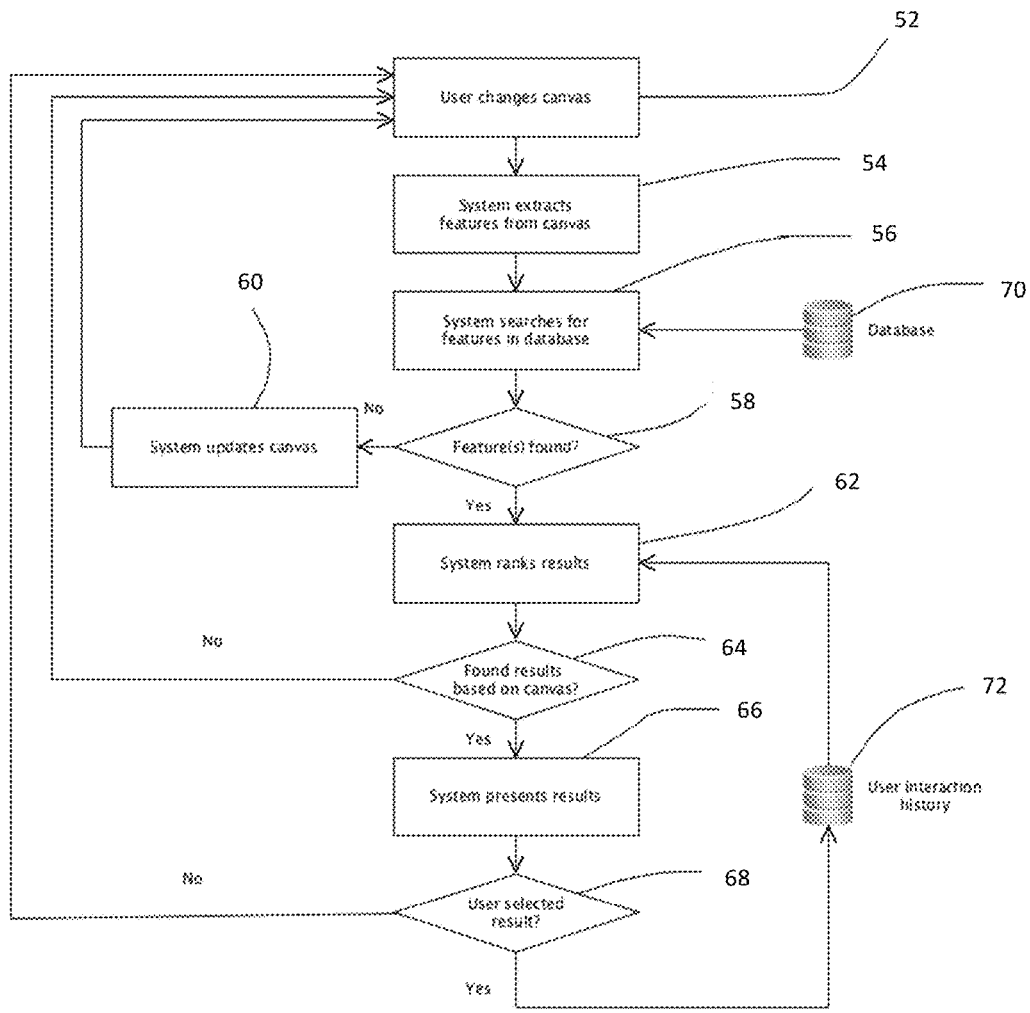
FIG. 2 shows a flow diagram for implementing a sketch-based retrieval system according to embodiments.

FIG. 2 depicts a flow diagram for implementing an embodiment of the sketch-based retrieval system 18 with reference to FIG. 1. In this illustrative approach, individual features or subsets of features extracted from the user inputs are first analyzed for feature based matches. After each match is made at the feature level, a composite match of the entire input (i.e., different layers, strokes, etc.) is attempted.

The process begins at 52 with the user making input changes to the canvas 30. This may involve any user action associated with the canvas, including sketching in an active layer, loading image data, adding a new layer to the canvas, etc. As noted, the input may include hierarchical information to assign different weights or importance to different inputs. Assigning importance to different inputs may involve implicit and explicit actions by the user. For example, implicit actions may involve: pen pressure by to rank different strokes; the time taken to draw a stroke; etc. Explicit actions may involve: manually assigning weights via an interface tool to prioritize layers or strokes; assigning thresholds for each layer or stroke to be more/less strict for matching of features with indexed images; etc.

Once the canvas 30 is changed with a new input or collection of inputs, the input/output manager 20 is triggered to extract associated features from the canvas 30 at 54. Extraction methods may for example include Extended Trace Transform (ETT) and Image Deformation Model Features (IDM), among others. Once extracted, the matching system 24 searches for the features at 56 using indexed data in database 70.

At 58, a determination is made whether features were located in the database 70 (e.g., within a predetermined confidence threshold). If no, the feedback system 26 updates the canvas 30 with feedback at 60 and waits for further user changes at 52. For example, the feedback system 26 may highlight the last input the user performed, i.e., a stroke added or an image loaded in the canvas 30. The highlight can be used to inform the user that the last change resulted in a problematic input, e.g., no database matches or it created a significant ambiguity. Highlighting can be done in any manner, for instance, highlighting in red, marking the border of the stroke, using a shaded pattern to cover the stroke, etc. The feedback system 26 may also suggest or propose inputs (e.g., with dashed lines, blinking lines, etc.) that, if entered, would increase the likelihood or result in a match.

If extracted features were matched with image related data in the database 70, the ranking system 28 ranks results at 62 using, e.g., an algorithm to match similarities between the extracted features and results. The ranked results may be displayed such that the user can select a best match. The ranking system 28 may collect and evaluate the user interaction history 72 of the extracted features, results, selections, and user identity. For instance, in the case where the user selects a second ranked item (e.g., eyeglasses) in the results instead of a first one (e.g., a bicycle), then the ranking system 28 registers this choice in the user interaction history database 72 with the extracted feature and user information. Thus, in future interactions, the ranking system 28 would consider the interaction history to better identify what the user is trying to draw and how to rank results based on past interactions.

At 64, the matching system 24 determines whether the various features matched so far (i.e., the collection of inputs in the canvas) results in a composite match. If the whole collection of features is not returning a composite match, then no results are presented to the user, or a best guess of matches may be presented. If the whole collection generates at least one match, then resulting images or the like from the database 70 are presented to the user as a ranked list at 66. The ranked list may be presented to the user in a user interface window, allowing the user to navigate and explore the results retrieved based on the current state of the canvas, including the combination of all layers composing the canvas 30.

If the user selects a result at 68 as a match, information associated with the match is retrieved from the database 70 and the user interaction history 72 is updated.

Figure 3:
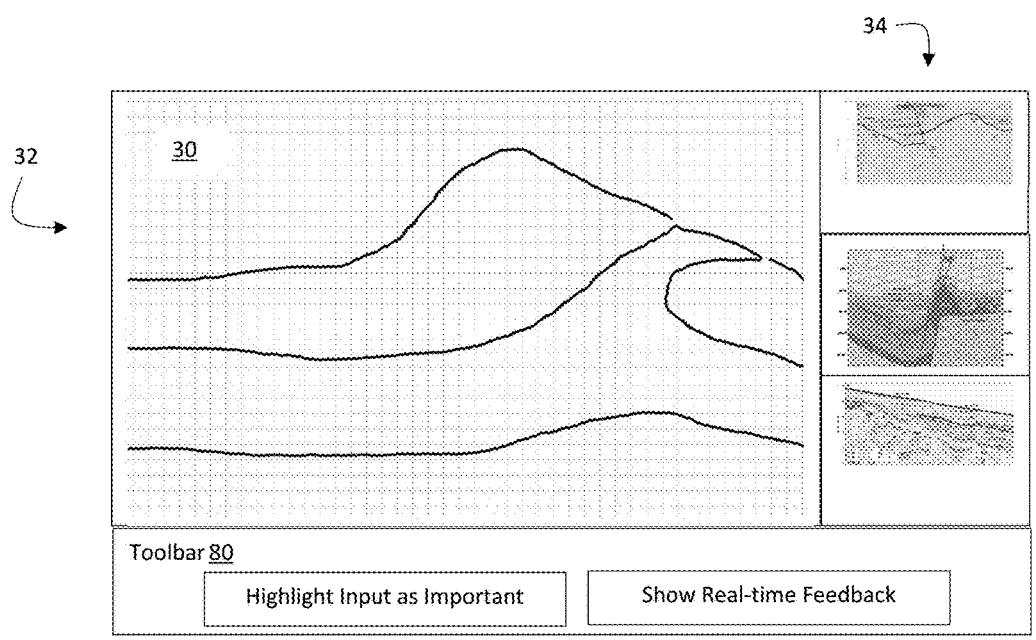
FIG. 3 shows a use case involving seismic data retrieval according to embodiments.

FIG. 3 depicts an illustrative use case involving seismic interpretation. In this example, a geologist has sketched an unfamiliar geologic feature on the canvas 30 and a ranked set of results 34 are returned. The user can click on a result to, e.g., link to more comprehensive information such as the source of the image, textual information, etc. A toolbar 80 is provide which allows the user to highlight one or more inputs as more important. Additionally, in the case where inaccurate or no matches are located, the user can choose to show real-time feedback, which may for example suggest additional inputs or corrective actions to enhance the search. The geologist could thus use the system 18 to search for geological concepts with sketching, which is a common technique used by geoscientists to communicate complex terms.

Figure 4:
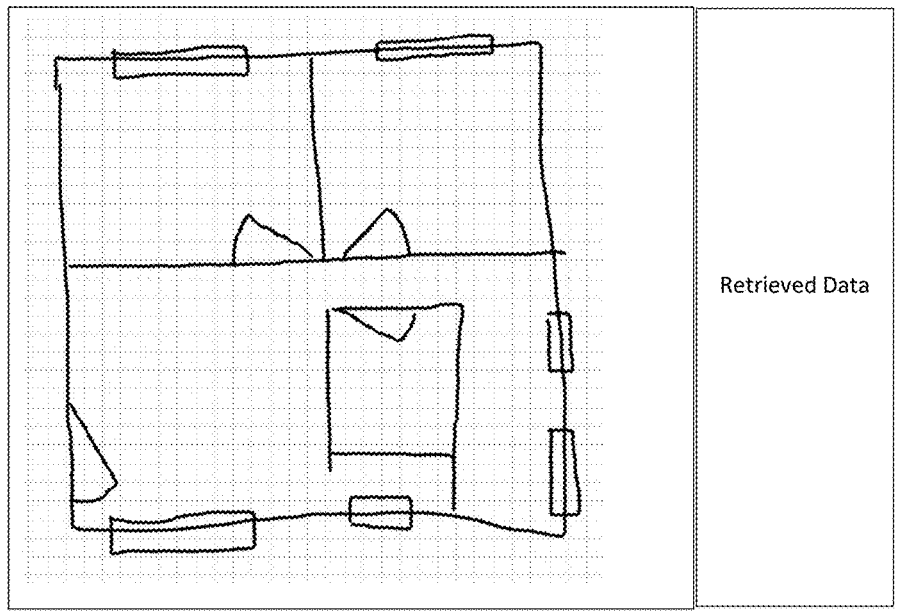
FIG. 4 shows a use case involving real estate data retrieval according to embodiments.

FIG. 4 depicts a further use case for the real estate industry. In this case, the user is looking for properties that have a particular configuration. The user could sketch the plan and further enrich the sketch by adding layers of detail, e.g., for windows, doors, neighborhoods, etc. The system 18 could evaluate these layers to find similar properties and return them to the user, either as retrieved image data, links, text information, etc.

Figure 5:
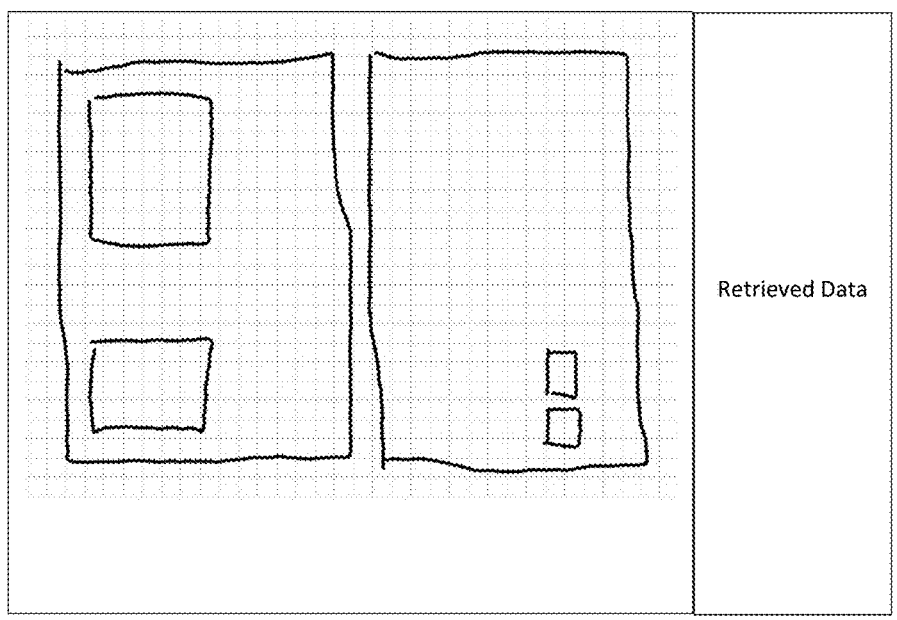
FIG. 5 shows a use case involving document data retrieval according to embodiments.

FIG. 5 depicts a further use case involving searching for a document in which only the general layout of certain pages of a book are recalled by the user. In this case, the user could sketch the layout of the document, e.g., drawing rectangles where the images were placed in the document pages. The user could specify additional layers that limited the search to a particular field of endeavor, a certain color, etc. Further, for elements the user was more certain of, e.g., the location of a picture, the user could highlight the element as more important. Once the user receives the list of results, the user can change the importance/threshold related to the submitted layers, indicating, for instance, that the layout should have a higher weight than the field of endeavor or the color.

It is understood that sketch-based retrieval system 18 may be implemented as a computer program product stored on a computer readable storage medium. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10, as shown in FIG. 1, may comprise any type of computing device and for example includes at least one processor 12, memory 21, an input/output (I/O) 14 (e.g., one or more I/O interfaces and/or devices), and a communications pathway 16. In general, processor(s) 12 execute program code which is at least partially fixed in memory 21. While executing program code, processor(s) 12 can process data, which can result in reading and/or writing transformed data from/to memory and/or I/O 14 for further processing. The pathway 16 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the sketch-based retrieval system 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A sketch-based retrieval system, comprising:
an interface having a canvas for entering inputs including user generated strokes, and for extracting features associated with the inputs;
a hierarchy system for assigning an importance to the inputs;
a matching system for retrieving matches from a database based on extracted features and importance associated with the extracted features;
a feedback system that provides real-time feedback on the canvas to suggest improved inputs for the user,
wherein the interface includes a toolbar having a first actuatable button, and in response to actuation of the first actuatable button, the feedback system prompts the user to highlight at least one of the entered inputs on the canvas,
wherein the toolbar further includes a second actuatable button, and in response to actuation of the second actuatable button, the feedback system suggests additional inputs to the canvas or corrective actions to the entered inputs on the canvas to enhance the retrieved matches from the database; and
a ranking system that ranks the retrieved matches and outputs the retrieved matches at the interface.

2. The sketch-based retrieval system of claim 1, wherein the strokes are submitted via a touch screen.

3. The sketch-based retrieval system of claim 1, wherein the inputs include different layers on the canvas.

4. The sketch-based retrieval system of claim 1, wherein the feedback system displays suggested inputs.

5. The system of claim 1, wherein the matching system is configured to display a set of ranked images on the canvas based upon the ranked retrieved matches.

6. The system of claim 1, wherein the feedback system suggests the additional inputs or corrective actions by displaying dashed lines on the canvas proximate the entered inputs.

7. The system of claim 1, wherein the feedback system suggests the additional inputs or corrective actions by displaying proposed inputs to guide the user in entering the inputs, wherein the proposed inputs include at least one of: dashed lines, blinking lines, or colored shapes.

8. A computer program product stored on a computer readable storage medium, which when executed by a computing system, provides sketch-based retrieval, the program product comprising:
program code for rendering an interface having a canvas for entering inputs including user generated strokes, and for extracting features associated with the inputs;
program code for assigning an importance to the inputs;

program code for retrieving matches from a database based on extracted features and importance associated with the extracted features;

program code that provides real-time feedback on the canvas to suggest improved inputs for the user, wherein the interface includes a toolbar having a first actuatable button, and in response to actuation of the first actuatable button, the program code that provides real-time feedback prompts the user to highlight at least one of the entered inputs on the canvas, wherein the toolbar further includes a second actuatable button, and in response to actuation of the second actuatable button, the program code that provides real-time feedback suggests additional inputs to the canvas or corrective actions to the entered inputs on the canvas to enhance the retrieved matches from the database; and program code that ranks the retrieved matches and outputs the retrieved matches at the interface.

9. The computer program product of claim 8, wherein the strokes are submitted via a touch screen.

10. The computer program product of claim 8, wherein the inputs include different layers on the canvas.

11. The computer program product of claim 10, wherein an importance is assignable to an individual layer within the different layers.

12. The computer program product of claim 8, wherein the program code for retrieving matches from the database is configured to display a set of ranked images on the canvas based upon the ranked retrieved matches.

13. The computer program product of claim 8, wherein the program code that provides real-time feedback suggests the additional inputs or corrective actions by displaying dashed lines on the canvas proximate the entered inputs.

14. The computer program product of claim 8, wherein the program code that provides real-time feedback suggests the additional inputs or corrective actions by displaying proposed inputs to guide the user in entering the inputs, wherein the proposed inputs include at least one of: dashed lines, blinking lines, or colored shapes.

15. A computerized method of providing sketch-based retrieval, comprising:

rendering an interface having a canvas for receiving inputs including user generated strokes, and for extracting features associated with the inputs;

assigning an importance to the inputs;

retrieving matches from a database based on extracted features and importance associated with the extracted features;

providing real-time feedback on the canvas to suggest improved inputs for the user, wherein the interface includes a toolbar having a first actuatable button, and in response to actuation of the first actuatable button, the method further comprises prompting the user to highlight at least one of the entered inputs on the canvas, wherein the toolbar further includes a second actuatable button, and in response to actuation of the second actuatable button, the method further comprises suggesting additional inputs to the canvas or corrective actions to the entered inputs on the canvas to enhance the retrieved matches from the database; and ranking retrieved matches for output at the interface.

16. The computerized method of claim 15, wherein the strokes are submitted via a touch screen.

17. The computerized method of claim 15, wherein the inputs include different layers on the canvas and an importance is assignable to an individual layer within the different layers.

18. The computerized method of claim 15, further comprising displaying a set of ranked images on the canvas based upon the ranked retrieved matches.

19. The computerized method of claim 15, further comprising suggesting the additional inputs or corrective actions by displaying dashed lines on the canvas proximate the entered inputs.

20. The computerized method of claim 15, further comprising suggesting the additional inputs or corrective actions by displaying proposed inputs to guide the user in entering the inputs, wherein the proposed inputs include at least one of: dashed lines, blinking lines, or colored shapes.

* * * * *